United States Patent [19]
Urry

[11] 4,442,186
[45] Apr. 10, 1984

[54] POROUS ANNULUS PROVIDING GAS CHANNELS BETWEEN ELECTRODE COMPARTMENTS

[75] Inventor: Lewis F. Urry, Columbia Station, Ohio

[73] Assignee: Union Carbide Corporation, Danbury, Conn.

[21] Appl. No.: 392,662

[22] Filed: Jun. 28, 1982

[51] Int. Cl.³ .............................................. H01M 2/18
[52] U.S. Cl. ..................................... 429/142; 429/174
[58] Field of Search ................ 429/144, 145, 174, 142

[56] References Cited

U.S. PATENT DOCUMENTS 3,758,343  9/1973  Magritz ................................ 429/145
4,302,517  11/1981  Dziak ..................................... 429/66

Primary Examiner—Donald L. Walton
Attorney, Agent, or Firm—William E. Dickheiser

[57] ABSTRACT

An improved miniature galvanic cell wherein a porous annulus is disposed between the base of a sealing gasket and a cell separator so as to provide passageways around the separator and between the electrode compartments for the exchange of gaseous products so as to reduced the overall internal pressure of the cell.

11 Claims, 8 Drawing Figures

POROUS ANNULUS PROVIDING GAS CHANNELS BETWEEN ELECTRODE COMPARTMENTS

DESCRIPTION

1. Technical Field

This invention relates to an improved miniature galvanic cell wherein a porous annulus is disposed between the base of a sealing gasket and a separator so as to provide passageways around the separator and between the electrode compartments for the exchange of gaseous products so as to reduce the overall internal pressure of the cell.

Applicant's copending U.S. Pat. application Ser. No. 392,711 filed herewith and entitled "Miniature Galvanic Cell Construction Providing Gas Channels Between Electrode Compartments" discloses a miniature galvanic cell having a sealing gasket with channels defined through the gasket so as to provide means for the exchange of gaseous products around the separator and between the electrode compartments.

2. Background Art

Galvanic cells are a popular source of portable electrical energy. Miniature sealed galvanic cells supply the power for portable electronic devices such as radios, hearing aids, watches and calculators.

Many liquid electrolytes used in galvanic cells will form a corrosive salt deposit on the exterior surface of the cell in which the electrolyte is used if the electrolyte leaks out of the cell. Such a corrosive deposit detracts from the appearance and marketability of a cell. These corrosive deposits may also damage the electronic device in which the cell is housed and short the cell. Therefore such galvanic cells are sealed to prevent electrolyte leakage.

Such a cell generally comprises a positive electrode, a negative electrode, a separator therebetween, and an electrolyte in ionic contact with the positive and negative electrodes, which components are housed in a container having a base, a sidewall and an open end and a cover over the open end of the container with an electrically insulating sealing gasket disposed and compressed between the container sidewall and the periphery of the cover. The base of the sealing gasket generally has a radially inwardly extending flange on which rests the peripheral edge of the cover. The separator generally does not extend so as to contact the container sidewall. When the cell is assembled the separator is compressed by the base of a sealing gasket from above and a rigid electrode or support ring from below, thereby sealing and separating the positive and negative electrode compartments.

A potential problem in certain types of sealed galvanic cells is that gaseous reaction products formed within the negative and positive electrode compartments may generate internal pressure. This pressure may build up and contribute to cell leakage and may cause the cell to distort or bulge. If the cell bulges, it may become wedged within the electronic device in which it is housed, or may damage the device or may do both. If internal gas pressure is disproportionately generated in one electrode compartment that pressure will press the separator against the electrode having the lower internal pressure. The separator may compress the electrode having lower internal pressure and in doing so move so as to separate somewhat from the opposing electrode. This separation will raise the resistance of the cell, possibly to above acceptable operating limits.

Gas evolution, depending on the particular cell system used, may occur during cell storage, during normal discharge or charge activities, or during abusive discharge conditions. In many cell systems, the gaseous products would further react with other cell components as by recombination so as to reduce the overall internal cell pressure if such other cell components were accessible. However, in many galvanic cells, the positive electrode and negative electrode compartments are physically isolated by a separator which, while not extending entirely to the container sidewall, is compressively sealed along its periphery between a cell insulating sealing gasket and a rigid electrode or a separator support ring. The separator minimizes the migration of positive and negative electrode materials and also poses a barrier to the passage of gaseous products. The interface between the base of the sealing gasket and the separator prevents migration of gas around the periphery of the separator. Hence a gaseous product which is formed in the positive electrode compartment is effectively prevented from reaching the negative electrode compartment where it may further react so as to reduce the internal pressure of the cell. Likewise, gaseous products in the negative electrode compartment are estopped from reaching the positive electrode compartment in conventional cell designs.

It would be a significant contribution to the field of miniature sealed galvanic cells to provide means for exchanging gaseous products between the positive and negative electrode compartments of such cells so as to reduce internal cell pressure. Thus it is an object of this invention to provide means for exchanging gaseous products between the positive and negative electrode compartments of miniature sealed galvanic cells.

It is another object of this invention to provide a miniature cell construction that utilizies an annulus interposed between the base of a sealing gasket and a separator which annulus has channels therethrough to provide means for the exchange of gaseous products around the separator and between the electrode compartments.

The foregoing and additional objects of this invention will become more fully apparent from the following description and accompanying drawings.

DISCLOSURE OF THE INVENTION

This invention relates to a sealed miniature galvanic cell comprising a housing having a container with a base, a sidewall and an open end, a cover disposed over the open end of the container and an electrically insulating sealing gasket compressively disposed between the container sidewall and the periphery of the cover, which housing contains a first electrode in electrical contact with the container, a second electrode in electrical contact with the cover, a separator interposed between the first and second electrodes and an electrolyte in ionic contact with the first and second electrodes; the improvement being an annulus which is compressively disposed between the base of the sealing gasket and the separator, which annulus has portions defining a plurality of channels which provide means for the exchange of gaseous products around the separator and between the first and second electrodes.

In accordance with the preferred embodiment of this invention a rigid, porous annulus is compressively disposed between the base of the sealing gasket and the separator. The porous annulus defines a plurality of channels which provide passageways for gases to pass through the interface between the sealing gasket and the separator thereby permitting the exchange of gaseous products between electrode compartments which may reduce the internal pressure of the cell.

Gaseous products may travel through the channels in the annulus and through the gap between the container sidewall and the separator to pass between electrode compartments.

In one embodiment of this invention the porous annulus may have a skeletal structure lacking clearly defined passageways therethrough, but nonetheless providing a plurality of channels across the width of the annulus for the passage of gaseous products there across. The channels may intermingle and overlap. The cross-sectional configuration of the channels in such an annulus may assume any geometric or irregular shape and may change cross-sectional shape arbitrarily as the channel advances across the width of the annulus.

Materials which may be used to produce the rigid skeletal annulus described above include open pored rigid foams and sintered plastics such as polyurethanes and phenolic resins.

An alternative embodiment of this invention comprises an annulus having well-defined channels therethrough which traverse the width of the annulus. Preferably, the channels are longitudinal and radially spaced-apart. The channels may be spaced at about 10° to about 90° intervals, preferably at about 45° to about 60° intervals.

Generally the width of the annulus does not exceed the width of the base of the sealing gasket. Therefore, in order to provide optimum channels for the exchange of gaseous products between the electrode compartments, the openings at one end of the channels are disposed on the inward facing wall of the annulus. The openings at the opposing end of the channels generally extend beyond the peripheral edge of the separator and preferably are disposed at the outer edge of the base of the annulus, facing the gap between the separator and the container sidewall wherein the periphery of the opposing electrode is exposed.

The channels in the annulus may be through the annulus as described above or in any similar fashion which provides a bridge between the cell electrodes or may simply extend across the base of the annulus. Each of the plurality of defined channels in the annulus described above could assume any cross-sectional configuration such as rectangular, circular, semi-circular, square or any polygonal or irregular shape or combination thereof.

The particular number of openings and the cross-sectional area of each opening will depend primarily on the cell system to be housed within the container and on the reaction products that are produced by the active electrode components of the cell system.

The embodiment of the invention wherein the annulus has defined channels requires an annulus which will maintain the channels when compressively disposed in an assembled cell. Materials which are suitable for such an annulus include polymeric fluorocarbons such as polytetrafluoroethylene, fluorinated ethylene-propylene polymer, ethylene copolymer with fluorinated ethylene-propylene polymer, polychlorotrifluoroethylene, and perfluoro-alkoxy polymer; polyvinyl; polyethylene; polypropylene; polystyrene; nylon and other materials which would be obvious to one skilled in the art.

The height of the annulus is preferably minimized so as not to significantly increase the overall height of the miniature cell. The height of the annulus is generally from about 0.001 inch (0.003 cm) to about 0.010 (0.025 cm) for miniature cells of 0.5 inch (1.27 cm) and smaller in height. Preferably the annulus is about 0.05 inch (0.13 cm) high for such miniature cells. The height of the annulus must be considered in the design of fixed-height miniature cells as it does contribute to the overall height of the cell.

The channels defined in accordance with this invention may remain void or may be filled with a material so long as the channels remain sufficiently porous and the material does not impede the passage of gaseous products therethrough. Under the physical conditions which exist within miniature cells wherein the cell system is damp but not flooded with electrolyte, the channels formed in accordance with this invention will remain free of liquid and so will not furnish a free ion path between the negative and positive electrode compartments which would otherwise have negated the function of the separator.

An additional benefit which is realized by having channels that bridge between the negative electrode compartment and the positive electrode compartment is that liquid electrolyte can be rapidly passed through such channels thereby simplifying and facilitating the assembly of miniature galvanic cells since the electrolyte need only be introduced into one electrode compartment.

The sealing gasket has to be stable in the presence of cell electrolyte and other cell components and may be selected from such materials as polymeric fluorocarbons, polyvinyl, polyethylene, polypropylene, polystyrene, nylon and other materials which are well known to those skilled in the art. While such materials remain stable in the cell environment some may be wetted by the cell electrolytes. If so, it is preferred to apply a nonwetting agent to the gasket which discourages electrolyte travel. Materials which act as nonwetting agents for various electrodes include fatty polyamides, polymeric silicones and asphalt.

The cell container and cover may be made of stainless steel, iron, nickel, monel, nickel-plated steel, copper clad steel, or some other conductive material that will not corrode or otherwise deteriorate when in contact with the cell components.

The separator for use in this invention has to be chemically inert and insoluble in the cell system and permit ion transfer between the negative and positive electrodes.

The above described embodiments of this invention which provide openings between the negative electrode compartment and the positive electrode compartment of a miniature cell are particularly preferable for miniature aqueous alkaline silver oxide/zinc cells that are known to generate gaseous products during storage. Hydrogen gas is known to form in the negative electrode compartment which contains zinc in monovalent and divalent silver oxide/zinc cells. If the hydrogen is permitted to migrate to the positive electrode compartment which contains silver oxide it will combine slowly with the electrolyte-wetted silver oxides. Also, oxygen gas can be formed by the decomposition of divalent silver oxide. If the oxygen can reach the opposing compartment of the cell it will combine readily with zinc that is wet with alkaline electrolyte. These reactions reduce the internal pressure in the cell and prevent leakage or bulging of the cell.

BRIEF DESCRIPTION OF DRAWINGS

The present invention will become apparent from the following description thereof when considered together with the accompanying drawings which are set forth as being exemplary of embodiments of the present invention and are not intended, in any way, to be limitative thereof and wherein.

DETAILED DESCRIPTION OF DRAWINGS

Figure 1:
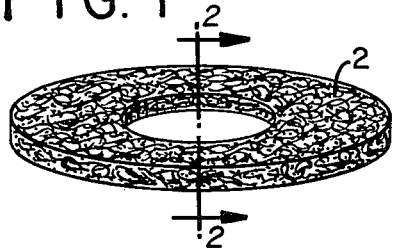
FIG. 1 is a perspective view of one embodiment of an annulus of this invention wherein the annulus has a skeletal structure.
Figure 2:
FIG. 2 is a sectional elevation view of the annulus of FIG. 1 taken through line 2—2.

Referring to FIGS. 1 and 2 there is shown in perspective an annulus 2 having a skeletal structure and adapted to be disposed and compressed between the base of a sealing gasket and a separator. The skeletal structure of the annulus 2 provides a network of passageways 3 which define a plurality of channels for the exchange of gaseous products across the width of the annulus and between the positive and negative electrode compartments of a miniature cell.

Figure 3:
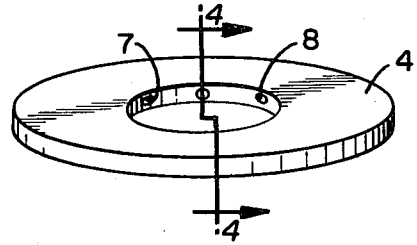
FIG. 3 is a perspective view of an alternative embodiment of an annulus of this invention wherein the annulus has a number of well-defined channels across the width of the annulus.
Figure 4:
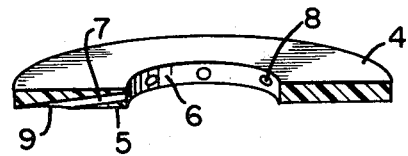
FIG. 4 is a sectional elevation view of the annulus of FIG. 3 taken through line 4—4.

There is shown in FIGS. 3 and 4 an annulus 4 of this invention having well-defined channels 7 therethrough at 45° intervals. The channels 7 traverse the width of the annulus and are positioned to have openings 8 and 9 facing the opposing electrode compartments. Openings 8 along the inward-facing wall 6 of the annulus provide access to one electrode compartment. The channels 7 extend radially outward and downward and have opposing openings 9 in the base 5 of the annulus 4 near its outer peripheral edge. In an assembled cell, the openings 9 face the gap between the container sidewall and the separator wherein the periphery of an electrode is exposed.

Figure 5:
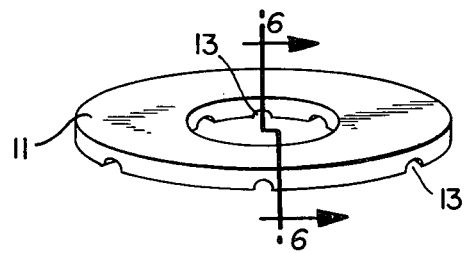
FIG. 5 is a perspective view of still another embodiment of an annulus of this invention wherein channels are disposed across the base of the annulus.
Figure 6:
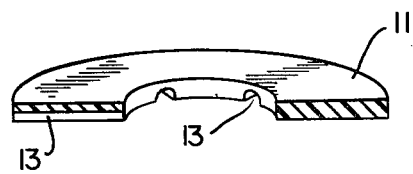
FIG. 6 is a sectional elevation view of the annulus of FIG. 5 taken through line 6—6.

FIGS. 5 and 6 show another embodiment of an annulus of this invention designated by the number 11. Well defined channels 13 spaced at 60° intervals extend across and divide the base of the annulus. Each channel 13 is shown as a longitudinal slot extending radially outwardly across the base of the annulus and having a semi-circular cross section. In an assembled cell the lengths of the channels are open to the gap between the container sidewall and the separator.

Figure 7:
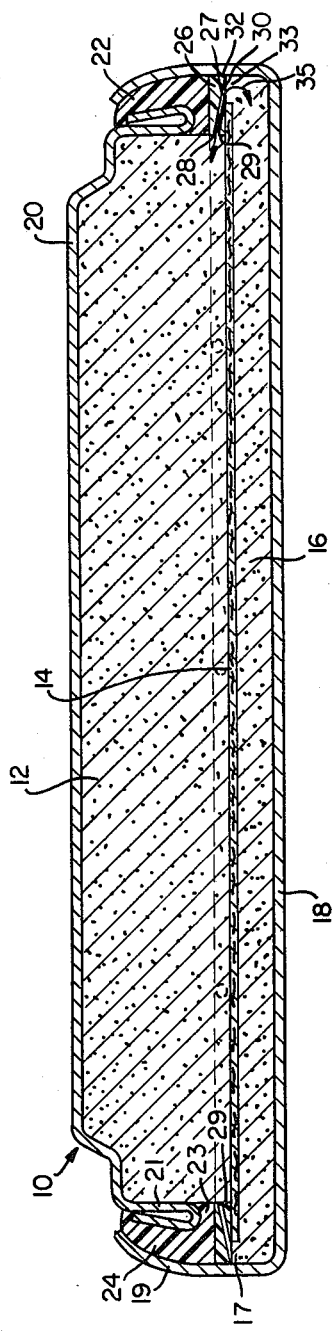
FIG. 7 is a sectional elevation view taken through an assembled miniature cell showing the annulus of FIGS. 3 and 4 assembled in a cell.
Figure 7A:
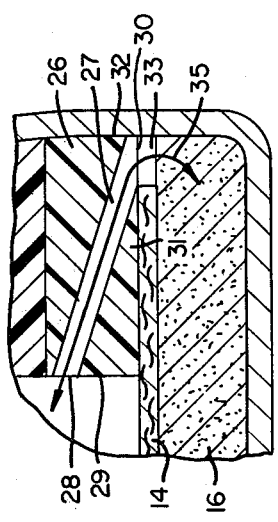
FIG. 7A is a partial enlarged sectional elevation view of the cell of FIG. 7 showing the annulus in greater detail.

FIGS. 7 and 7A show a typical miniature cell 10 having a negative electrode 12, a separator 14 and a positive electrode 16 housed in a two-part assembly comprising a container 18 and a cover 20. Disposed between the cover 20 and the container 18 is a sealing gasket 22 comprising an upright sidewall 24 which is disposed and compressed between the U-shaped periphery 21 of cover 20 and the upper sidewall 19 of container 18 and a radially inwardly disposed flange 23. The separator 14 extends partially across the top of positive electrode 16, leaving the positive electrode uncovered along its upper peripheral edge 17. A gas exchange annulus 26 of the type shown in FIGS. 3 and 4 is compressively disposed between the base of the sealing gasket 22 and the separator 14. Specifically, the gas exchange annulus 26 has channels 27 traversing the width of the annulus at 45° intervals. The channels 27 (some of which are shown in dotted outline) have openings 28 along the inwardly facing surface of the annulus 29 and opposing openings 30 through the base of the annulus 31 near the outer edge of the annulus 32 and at the gap 33 between the separator 14 and the container sidewall 17.

As gaseous products evolve in either the negative electrode 12 or the positive electrode 16 the gases can migrate around the separator 14 to the opposing electrode compartment by means of the channels 27 provided by the annulus 26 and the gap 33, which migration path is designated by an arrow 35 in FIG. 5.

Although preferred embodiments of this invention have been described in detail, it is contemplated that modifications and changes to the preferred embodiments of the invention herein shown and described can be made without departing from the spirit and scope of the invention.

I claim:

1. A sealed miniature galvanic cell comprising a housing having a container with a base, a sidewall and an open end, a cover disposed over the open end of the container and an electrically insulating sealing gasket compressively disposed between the container sidewall and the periphery of the cover, which housing contains a first electrode in electrical contact with the container, a second electrode in electrical contact with the cover, a separator interposed between the first and second electrodes and an electrolyte in ionic contact with the first and second electrodes; the improvement being a rigid annulus which is compressively disposed between the base of the sealing gasket and the separator, which annulus has portions defining a plurality of channels which provide means for the exchange of gaseous products around the separator and between the first and second electrodes.

2. The sealed miniature galvanic cell in accordance with claim 1 wherein said annulus comprises a skeletal structure.

3. The sealed miniature galvanic cell in accordance with claim 1 or 2 wherein said annulus is made from materials selected from the group consisting of phenolic resins and polyurethanes.

4. The sealed miniature galvanic cell in accordance with claim 1 wherein said plurality of channels in the annulus comprise longitudinal radially-spaced apart channels.

5. The sealed miniature galvanic cell in accordance with claim 4 wherein said channels are spaced apart at intervals of from about 10° to about 90°.

6. The sealed miniature galvanic cell in accordance with claim 4 wherein said channels are spaced apart at intervals of from about 45° to about 60°.

7. The sealed miniature galvanic cell in accordance with claim 4 wherein said annulus is made from materials selected from the group consisting of polymeric fluorocarbons, polyvinyl, polyethylene, polypropylene, polystyrene and nylon.

8. Sealed miniature galvanic cell in accordance with claim 4 wherein said channels have openings along the inwardly facing wall of said annulus and opposing openings radially outwardly along the base of said annulus near the outer periphery of said annulus.

9. The sealed miniature galvanic cell in accordance with claim 4 wherein said channels extend across the base of said annulus.

10. The sealed miniature galvanic cell in accordance with claim 1 wherein said electrolyte is an alkaline electrolyte.

11. The sealed miniature galvanic cell in accordance with claim 1 or 10 wherein said positive electrode comprises silver oxide and said negative electrode comprises zinc.

* * * * *